United States Patent
Balz et al.

(10) Patent No.: US 6,405,622 B1
(45) Date of Patent: *Jun. 18, 2002

(54) SUPPORT APPARATUS FOR POSITIONING A WORKPIECE

(75) Inventors: James G. Balz; Mark J. LaPlante, both of Walden; David C. Long, Wappingers Falls; Keith C. O'Neil, Hughsonville; Thomas Weiss, Poughquag, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/478,241

(22) Filed: Jan. 4, 2000

Related U.S. Application Data

(63) Continuation of application No. 08/758,804, filed on Dec. 3, 1996.

(51) Int. Cl.[7] .............................................. B23K 37/04
(52) U.S. Cl. ............................... 83/13; 83/559; 83/477; 83/466.1
(58) Field of Search .......................... 83/581, 762, 767, 83/471.3, 486.1, 468, 468.2, 468.3, 766, 764, 765, 472, 477, 699.31, 698.11, 559, 466.1, 560, 648, 916, 925.1, 451, 649

(56) References Cited

U.S. PATENT DOCUMENTS

| | | | |
|---|---|---|---|
| 1,168,838 A | 1/1916 | Weber | |
| 2,726,721 A | 12/1955 | Segal | |
| 3,246,554 A | * 4/1966 | Stefano et al. | 83/560 |
| 3,612,814 A | 10/1971 | Houldcroft et al. | |
| 3,877,334 A | 4/1975 | Gerber | |
| 4,047,457 A | * 9/1977 | Stubbings | 83/916 |
| 4,116,097 A | 9/1978 | Graham et al. | |
| 4,186,632 A | 2/1980 | Leslie et al. | |
| 4,204,448 A | 5/1980 | Pearl | |
| 4,249,438 A | 2/1981 | Kelley | |
| 4,372,183 A | * 2/1983 | Lehtinen | 83/916 |
| 4,522,092 A | * 6/1985 | Dorosz | 83/565 |
| 4,646,600 A | * 3/1987 | Flick et al. | 83/560 |
| 4,693,153 A | 9/1987 | Wainwright et al. | |
| 4,728,379 A | 3/1988 | Audi et al. | |
| 4,847,954 A | 7/1989 | Lapeyre et al. | |
| 4,869,141 A | * 9/1989 | Klingel | 83/916 |
| 4,985,982 A | 1/1991 | Lohr et al. | |
| 5,018,418 A | * 5/1991 | Nasu | 83/451 |
| 5,132,510 A | 7/1992 | Klingel et al. | |
| 5,227,606 A | 7/1993 | Weeks et al. | |
| 5,338,914 A | 8/1994 | Omote | |
| 5,481,083 A | 1/1996 | Smyth, Jr. | |
| 5,825,652 A | * 10/1998 | LeBlond et al. | 83/451 |
| 6,055,894 A | * 5/2000 | Balz et al. | 83/13 |

* cited by examiner

Primary Examiner—M. Rachuba
Assistant Examiner—Kim Ngoc Tran
(74) Attorney, Agent, or Firm—DeLio & Peterson, LLC; Peter W. Peterson

(57) ABSTRACT

The present invention is a workpiece support apparatus and method of making of using the same. A holding fixture frame supports the workpiece about the perimeter and also locates the workpiece. A series of support wires keep the workpiece from sagging inside the holding fixture frame. The support wires provide support while allowing top and bottom access to the workpiece. The workpiece remains flat at the point of the machining operation.

31 Claims, 3 Drawing Sheets

SUPPORT APPARATUS FOR POSITIONING A WORKPIECE

This is a continuation of copending application Ser. No. 08/758,804 filed on Dec. 3, 1996.

BACKGROUND OF THE INVENTION

1. Field of the Invention

The present invention relates to a workpiece support apparatus and, in particular, to an apparatus which positions the workpiece and provides support while allowing access to both sides of the workpiece.

2. Description of Related Art

Electronic packages such as multilayer ceramic packages can be manufactured using unfired ceramic greensheets which are nominally 0.2 mm or 0.28 mm thick. Typical greensheets which are 185 mm or 215 mm wide are worked to make up to nine parts or electronic packages per sheet.

It is desirable to use larger workpieces, for example, 450 mm wide greensheets could be used to make up to 81 electronic packages per sheet. However, larger greensheets are subject to sagging and stretching which makes them difficult to handle and work. Tooling such as cutting, punching, laser cutting, drilling or the like requires appropriate support. Present methods do not facilitate the working of large workpieces because they do not provide the appropriate support for the workpiece which could cause inaccurate patterning.

Further, conventional methods limit access to at least one side of the workpiece, i.e. the bottom side, and provide a limited active area. The active area of the workpiece is the area subject to the tooling. For example, a 450 mm wide greensheet can have an active area 418 mm wide. Access to all sides of the active area is preferred. For instance, access to the bottom side of a workpiece would allow the positioning of tooling, such as a vacuum plenum, underneath the workpiece and access to the largest possible area would alleviate the problem of void areas which cannot be worked.

Bearing in mind the problems and deficiencies of the prior art, it is therefore an object of the present invention to provide a workpiece support apparatus for supporting a workpiece whereby access to an entire active area is possible.

It is another object of the present invention to provide a workpiece support apparatus for supporting a workpiece whereby access to top and bottom workpiece areas is provided.

A further object of the invention is to provide a workpiece support apparatus for supporting a workpiece which minimizes sagging and stretching of the workpiece, particularly at the point of the machining operation.

It is yet another object of the present invention to provide a workpiece support apparatus for supporting large flexible workpieces.

It is yet another object of the present invention to provide a workpiece support apparatus which may be used for positioning the workpiece.

Still other objects and advantages of the invention will in part be obvious and will in part be apparent from the specification.

SUMMARY OF THE INVENTION

The above and other objects, which will be apparent to those skilled in the art, are achieved by the present invention which in a first aspect relates to a workpiece support apparatus for positioning a workpiece comprising: a holding fixture frame; a means to secure the workpiece to said holding fixture frame; and a support member for supporting the workpiece, said support member being secured to said holding fixture frame for movement with respect to said holding fixture frame; whereby at least a portion of said support member is adapted to contact the workpiece and said holding fixture frame and the workpiece are movable with respect to said support member while said support member contacts the workpiece.

In another aspect, the present invention relates to a workpiece support apparatus for positioning a workpiece comprising: a stationary base; an X-Y positioning system mounted to said base adapted to facilitate movement of the workpiece; a holding fixture frame mounted to said X-Y positioning system, said holding fixture frame having first and second opposing inside edges and an outside surface; a plurality of rollers mounted to said holding fixture frame; a guide rail rolling support assembly comprising first and second spaced guide rails with first and second ends and guide rail rolling supports, said first guide rail rolling support mounted to said first and second guide rails at said first ends, said second guide rail rolling support mounted to said first and second guide rails at said second ends, said guide rail rolling support assembly moves along said holding fixture frame opposing first and second inside edges; a plurality of support wires attached at one end to said first guide rail and at another end to said second guide rail each of said support wires received by aligned grooves in said holding fixture frame outside surface and said rollers; and a plurality of locator pins adapted to hold the workpiece in place on said holding fixture frame.

In another aspect, the present invention relates to a method of positioning a workpiece comprising the steps of: a) providing a workpiece support apparatus for positioning a workpiece comprising: a holding fixture frame; a means to secure the workpiece to said holding fixture frame; a support member for supporting the workpiece, said support member being secured to said holding fixture frame for movement with respect to said holding fixture frame; whereby at least a portion of said support member is adapted to contact the workpiece and said holding fixture frame and workpiece are movable with respect to said support member while said support member contacts the workpiece; b) providing a workpiece; c) placing the workpiece on said workpiece support apparatus support members; d) moving said holding fixture frame with respect to said support member to effect movement of said holding fixture frame and the workpiece; and e) positioning the workpiece in a desired position.

In another aspect, the present invention relates to a method of positioning a workpiece comprising the steps of: a) providing a workpiece support apparatus for positioning a workpiece comprising: a stationary base; an X-Y positioning system mounted to said base adapted to facilitate movement of the workpiece; a holding fixture frame mounted to said X-Y positioning system, said holding fixture frame having first and second opposing inside edges and an outside surface; a plurality of rollers mounted to said holding fixture frame; a guide rail rolling support assembly comprising first and second spaced guide rails with first and second ends and guide rail rolling supports, said first guide rail rolling support mounted to said first and second guide rails at said first ends, said second guide rail rolling support mounted to said first and second guide rails at said second ends, said guide rail rolling support assembly moves along said holding fixture frame opposing first and second inside edges; a plurality of support wires attached at one end to said first guide rail and at another end to said second guide rail each of said support wires received by aligned grooves in said holding fixture frame outside surface and said rollers; and a plurality of locator pins adapted to hold the workpiece in place on said holding fixture frame; b) providing a workpiece; c) placing the workpiece on said workpiece support apparatus support wires; d) moving said X-Y positioning system with respect to said base to effect movement of said holding fixture frame and the workpiece; and e) positioning the workpiece in a desired position.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
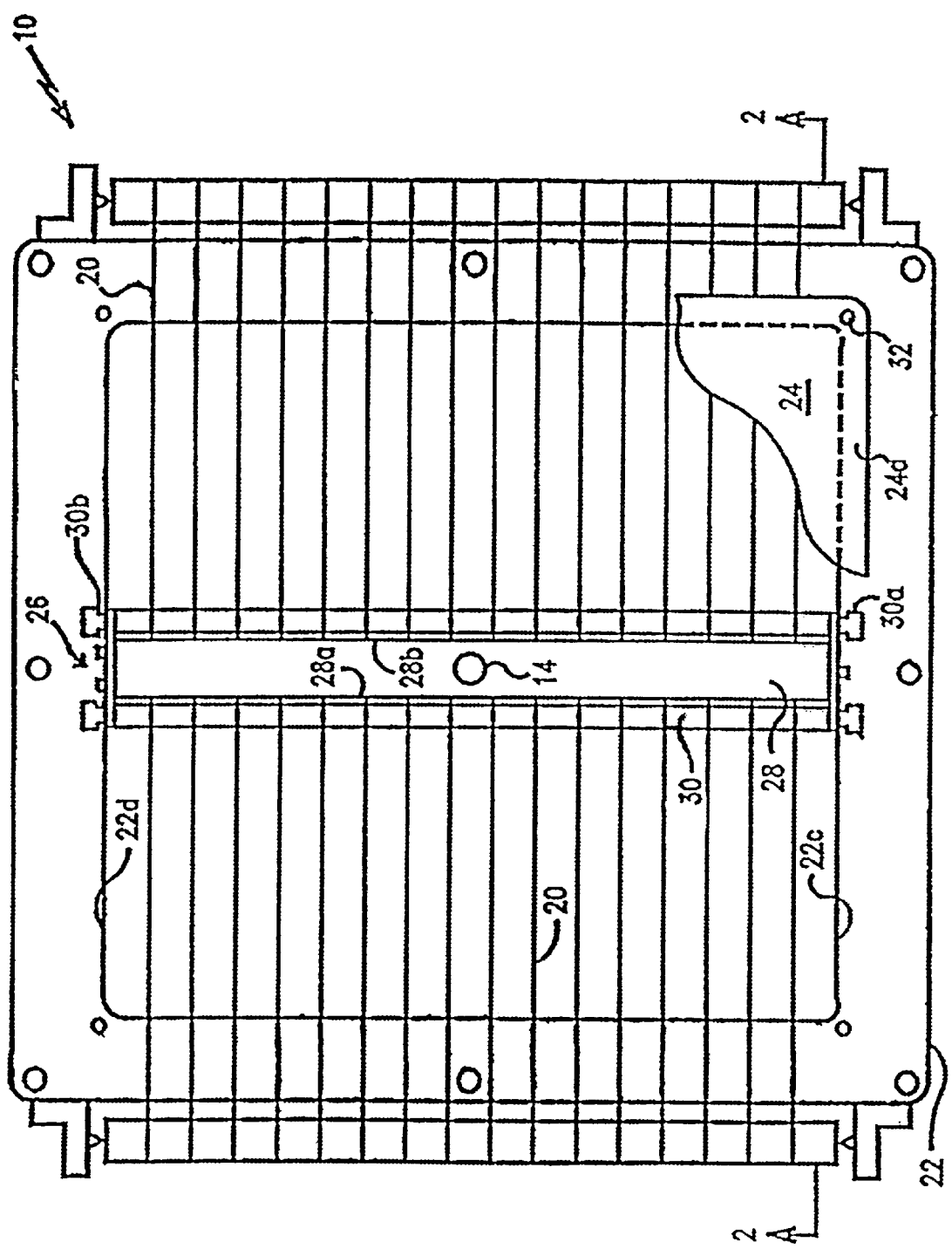
FIG. 1 is a top plan view of the workpiece support apparatus (shown without the tooling system top portion) supporting a workpiece which is shown cut away.

In describing the preferred embodiment of the present invention, reference will be made herein to FIGS. 1–3 of the drawings in which like numerals refer to like features of the invention. Features of the invention are not necessarily shown to scale in the drawings.

The apparatus of the present invention, illustrated in FIG. 1, is a workpiece support apparatus 10 for positioning a workpiece 24 comprising a holding fixture frame 22; locator pins 32 which provide a means to secure the workpiece to the holding fixture frame; and a support member 20 for supporting the workpiece. The support member 20 is secured to the holding fixture frame 22 for movement with respect to the holding fixture frame 22. At least a portion of the support member 20 contacts the workpiece 24, and the holding fixture frame 22, and workpiece 24, are movable with respect to the support member 20 in contact with the workpiece 24 while the support member 20 supports the workpiece 24.

Preferably, four locator pins provide a means to secure the workpiece to the holding fixture frame. The locator pins 32, positioned at the perimeter of the workpiece 24, are received by the holding fixture frame 22. A vacuum device (not shown) may also be used to hold the workpiece 24. Preferably, more than one vacuum device (not shown) is positioned about the perimeter 24a of the workpiece 24 for holding the workpiece 24 in place on the holding fixture frame 22.

The support member 20, as shown in FIG. 1, can be support wires or a wire mesh, or other suitable means which provide support while allowing access to both sides of the workpiece. Preferably, the support member comprises sixteen parallel support wires 20 spaced at 2.54 cm (1 in.) centers for supporting a 450 mm wide greensheet, wherein each of the support wires is two separate lengths or sections of wire coupled together by a tensioner 40 for maintaining tension on the support wires. However, the number of support wires used may be more or less depending upon the application.

In the preferred embodiment the workpiece support apparatus 10 comprises a stationary base 34 and an X-Y positioning system 38 mounted to the base 34 for facilitating movement of the workpiece 24. A holding fixture frame 22, shown with hatched lines in FIGS. 1–3, is mounted to the X-Y positioning system 38. The holding fixture frame 22 has first and second opposing inside edges 22c,d and an outside surface 22a. Preferably, an upper roller and a lower roller is mounted on each of two opposing sides of the holding fixture frame. However, other configurations having more or less rollers may be used. The apparatus 10 further comprises a guide rail rolling support assembly 26 which includes first and second spaced guide rails 28a,b and guide rail rolling supports 30a,b. Preferably the guide rails are parallel and spaced at about 38.1 mm (1.5 inches) apart. The space 29 keeps small moves of the holding fixture frame 22 from unnecessarily activating or starting movement of the guide rail rolling supports 30. The first guide rail rolling support 30a is mounted to the first and second guide rails 28a,b at the first ends and the second guide rail rolling support 30b is mounted to the first and second guide rails 28a,b at the second ends. The guide rail rolling support assembly 26 moves along the holding fixture frame 22 opposing first and second inside edges 22c,d from one side of the holding fixture frame 22 to the other.

Figure 2:
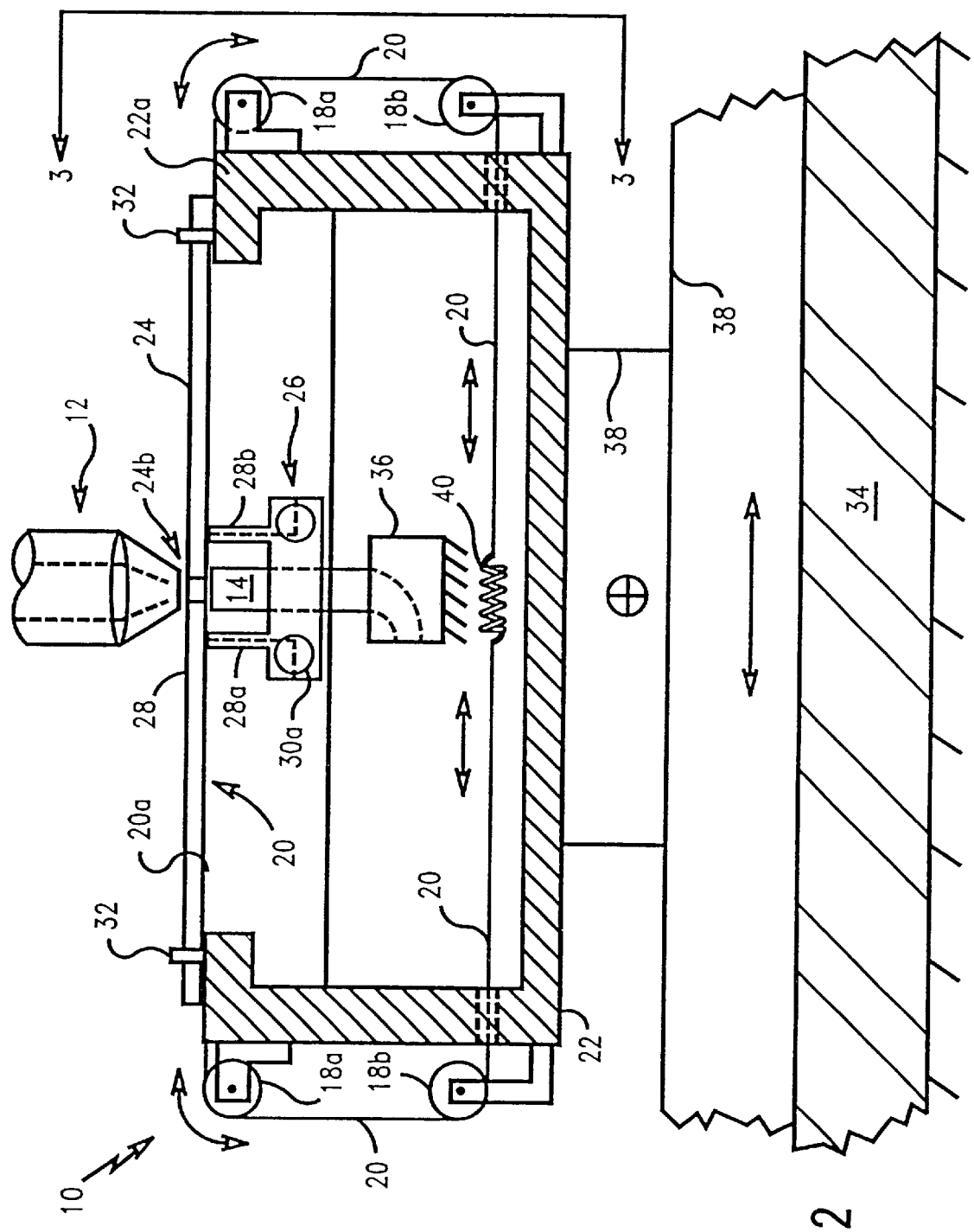
FIG. 2 is a cross-sectional side view of the workpiece support apparatus along line 2—2 of FIG. 1.
Figure 3:
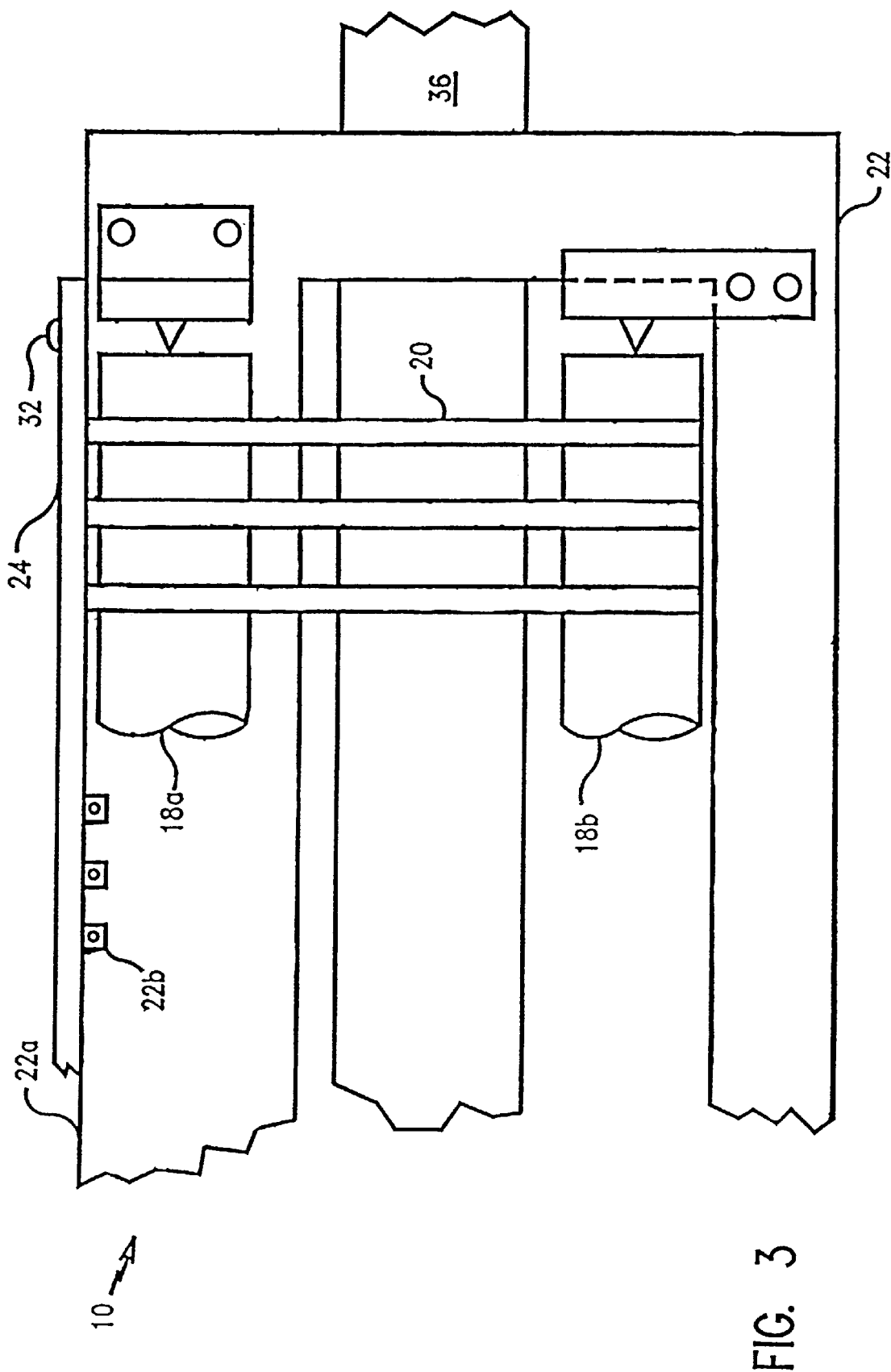
FIG. 3 is a cut away side view of the holding fixture frame along line 3—3 of FIG. 2 illustrating the rollers, grooves on the top surface of the holding fixture frame and three support wires in place.

The workpiece support apparatus 10 of FIG. 2 is further configured to include a plurality of locator pins, preferably four to hold the workpiece 24 in place on the holding fixture frame 22. Support wires, for supporting the workpiece, are attached at one end to the first guide rail 28a and at another end to the second guide rail 28b and preferably include the tensioner configuration described above. Each of the support wires 20 is received by aligned grooves in the holding fixture frame outside surface 22b and the rollers 18a. As illustrated in FIG. 3, the grooves 22b in the holding fixture frame 22 are preferably square and maintain the outside surface 20a of the support wires 20 at the same height as the outside surface 22a of the holding fixture frame 22. The grooves 18a in the rollers 18 are preferably V-shaped and are aligned with the grooves 22b in the holding fixture frame 22. The grooves 18a keep the support wires from drifting from side-to-side about the rollers 18.

As illustrated in FIG. 2, the workpiece support apparatus 10 further comprises a bridge 36. The bridge 36 is fixed to the base 34 and is positioned in an area between the base 34 and the holding fixture frame 22 and between the rollers 18. The apparatus 10 of FIG. 2 which may include a tool system having a first portion 12 and a second portion 14. The first portion 12 is mounted to the base 34 and preferably is a laser. The second portion 14 is fixed to the bridge 36. Preferably, the outside surface of the tooling system second portion 14 lies in the same plane as the outside surface 22a of the holding fixture frame 22 and is configured such that the tooling system second portion 14 provides the means 14 for stopping movement of the guide rail rolling support. This configuration is shown, for example, in FIG. 2 where a vacuum inlet post 14 is positioned between the guide rails 28a,b. The vacuum inlet post 14 further serves to hold down the workpiece at its point of focus 24b. While the preferred tooling system first portion 12 is a laser and the preferred tooling system second portion 14 is a vacuum, other tooling systems may be used. For example, a camera and a light, a punch head and a punch die or any suitable tooling system may be used with the apparatus 10. The apparatus 10 is particularly well suited for applications where access to the bottom side of the workpiece is required or where a flexible workpiece is being tooled.

In operation, the tooling system first portion 12 and the bridge 36, with the tooling system second portion attached, remain stationary with respect to the base 34. As the X-Y positioning system 38 moves, it effects movement of the workpiece 24 such that the desired focus point of the workpiece 24 is below the tooling system first portion 12. Subsequent movement of the apparatus 10 depends upon the direction of movement of the X-Y positioning system 38. When the X-Y positioning system 38 is moved to effect movement of the holding fixture frame 22 in a direction perpendicular to the length of the bridge 36, one of the guide rails 28 will contact the tooling system second portion 14 and activate the guide rail rolling supports 30 and the rollers 28. The guide rail rolling supports 30 will ride along the holding fixture frame inside edges 22c,d and each of the support wires 20 will retract on one side of the tensioner 40 and extend on the other side of the tensioner 40. Thus, the support wires traverse back and forth beneath the workpiece 24 and the workpiece 24 remains supported while allowing access to the active area of the workpiece 24. The X-Y positioning system 38 may also move to effect parallel motion to the length of the bridge 36. Further, the apparatus 10 may also cause diagonal motion by sliding the guide rails 28 along the tooling system second portion 14 and concurrently moving the guide rail rolling supports 30.

The present invention provides an apparatus for supporting a workpiece, particularly a large flexible workpiece. Further, the apparatus positions the workpiece for tooling and allows access to the entire active area as well as the top and bottom of the workpiece. Sagging and stretching of the workpiece is minimized, particularly at the point of machining operation.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of positioning a workpiece comprising the steps of:
    a) providing a workpiece support apparatus for positioning a workpiece comprising:
        a stationary base;
        an X-Y positioning system mounted to said base adapted to facilitate movement of the workpiece;
        a holding fixture frame mounted to said X-Y positioning system, said holding fixture frame having first and second opposing inside edges and an outside surface;
        a plurality of rollers mounted to said holding fixture frame;
        a guide rail rolling support assembly comprising first and second spaced guide rails with first and second ends and guide rail rolling supports, said first guide rail rolling support mounted to said first and second guide rails at said first ends, said second guide rail rolling support mounted to said first and second guide rails at said second ends, said guide rail rolling support assembly moves along said holding fixture frame opposing first and second inside edges;
        a plurality of support wires attached at one end to said first guide rail and at another end to said second guide rail each of said support wires received by aligned grooves in said holding fixture frame outside surface and said rollers; and
        a plurality of locator pins adapted to hold the workpiece in place on said holding fixture frame;
    b) providing a workpiece;
    c) placing the workpiece on said workpiece support apparatus support wires;
    d) moving said X-Y positioning system with respect to said base to effect movement of said holding fixture frame and the workpiece; and
    e) positioning the workpiece in a desired position.

2. The method as claimed in claim 1 wherein in step (a) said workpiece support apparatus further comprises:
    a means for stopping movement of said guide rail rolling support; and
    a bridge fixed to said base, positioned in an area between said holding fixture frame and said base and between said rollers, said means for stopping movement of said guide rail rolling support fixed to said bridge.

3. The method as claimed in claim 2 wherein step (b) further comprises moving said X-Y positioning system to effect movement of said holding fixture frame inside edges in a direction perpendicular to said bridge and contacting one of said guide rails with said means for stopping movement of said guide rail rolling supports while concurrently moving said X-Y positioning system to effect movement of said holding fixture frame inside edges in a direction parallel to said bridge.

4. The method as claimed in claim 2 wherein step (b) further comprising the steps of:
    c) moving said X-Y positioning system to effect movement of said holding fixture frame inside edges in a direction perpendicular to said bridge until one of said guide rails contacts said means for stopping movement of said guide rail rolling supports; and
    d) moving said X-Y positioning system to effect movement of said holding fixture frame inside edges in a direction parallel to said bridge.

5. The method as claimed in claim 4 wherein in step (a) each of said support wires is two pieces coupled together by a tensioner for maintaining tension on said support wires.

6. The method as claimed in claim 5 wherein step (c) further comprises moving said guide rail rolling support and said rollers while retracting said support wire on one side of said tensioner and extending said support wire on another side of said tensioner.

7. A method of positioning a workpiece comprising the steps of:
    a) providing a workpiece support apparatus for positioning a workpiece comprising:
        a holding fixture frame;
        a means to secure the workpiece to said holding fixture frame;
        a support member for supporting the workpiece, said support member being secured to said holding fixture frame for movement with respect to said holding fixture frame;
        whereby at least a portion of said the support member is adapted to contact the workpiece and said holding fixture frame and workpiece are movable with respect to said support member while said support member contacts the workpiece;

b) providing a workpiece;

c) placing the workpiece on said workpiece support apparatus support members;

d) moving said holding fixture frame with respect to said support member to effect movement of said holding fixture frame and the workpiece; and e) positioning the workpiece in a desired position.

8. A workpiece support apparatus for positioning a workpiece comprising:

a stationary base;

an X-Y positioning system mounted to said base adapted to facilitate movement of the workpiece;

a holding fixture frame mounted to said X-Y positioning system, said holding fixture frame having first and second opposing inside edges and an outside surface;

a plurality of rollers mounted to said holding fixture frame;

a guide rail rolling support assembly comprising first and second spaced guide rails with first and second ends and guide rail rolling supports, said first guide rail rolling support mounted to said first and second guide rails at said first ends, said second guide rail rolling support mounted to said first and second guide rails at said second ends, said guide rail rolling support assembly moves along said holding fixture frame opposing first and second inside edges;

a plurality of support wires attached at one end to said first guide rail and at another end to said second guide rail each of said support wires received by aligned grooves in said holding fixture frame outside surface and said rollers; and a plurality of locator pins adapted to hold the workpiece in place on said holding fixture frame.

9. The apparatus as claimed in claim 8 further comprising:

a means for stopping movement of said guide rail rolling support; and a bridge fixed to said base, positioned in an area between said base and said holding fixture frame and between said rollers, said means for stopping movement of said guide rail rolling support fixed to said bridge.

10. The apparatus as claimed in claim 9 further comprising a tool system having an first portion and a second portion, said first portion mounted to said base, said second portion mounted to said bridge.

11. The apparatus as claimed in claim 10 wherein said tool system first portion is a laser and said tool system second portion is a vacuum.

12. The apparatus as claimed in claim 10 wherein said tool system first portion is a camera and said tool system second portion is a light.

13. The apparatus as claimed in claim 10 wherein said tool system first portion is a punch head and said tool system second portion is a punch die.

14. The apparatus as claimed in claim 8 wherein each of said support wires is two pieces coupled together by a tensioner for maintaining tension on said support wires.

15. The apparatus as claimed in claim 8 wherein said locator pins are positioned at the perimeter of the workpiece and are received by said holding fixture frame.

16. The apparatus as claimed in claim 8 wherein said guide rails are parallel.

17. The apparatus as claimed in claim 8 further comprising a plurality of vacuum devices positioned about the perimeter of the workpiece for holding the workpiece in place on said holding fixture frame.

18. A workpiece support apparatus for positioning a workpiece comprising:

a holding fixture frame mounted to an X-Y positioning system, whereby said X-Y positioning system is mounted to a base;

a means to secure the workpiece to said holding fixture frame; and a support member for supporting the workpiece, said support member being secured to said holding fixture frame for movement with respect to said holding fixture frame;

whereby at least a portion of said support member is adapted to contact the workpiece and whereby said holding fixture frame and the workpiece are movable in unison with respect to said support member by the X-Y positioning system while said support member contacts the workpiece, whereby a bridge is mounted to said base.

19. The apparatus as claimed in claim 18 further comprising a tool system having a first portion and a second portion, said first portion mounted to said base, said second portion mounted to said bridge.

20. The apparatus as claimed in claim 19 wherein said tool system first portion is a laser and said tool system second portion is a vacuum.

21. The apparatus as claimed in claim 19 wherein said tool system first portion is a camera and said tool system second portion is a light.

22. The apparatus as claimed in claim 19 wherein said tool system first portion is a punch head and said tool system second portion is a punch die.

23. A workpiece support apparatus for positioning a workpiece comprising:

a holding fixture frame;

a means to secure the workpiece to said holding fixture frame; and a support member for supporting the workpiece, said support member being secured to said holding fixture frame for movement with respect to said holding fixture frame;

whereby at least a portion of said support member is adapted to contact the workpiece and whereby said holding fixture frame and the workpiece are movable in unison with respect to said support member while said support member contacts the workpiece.

24. The apparatus as claimed in claim 23 wherein said support member comprises a plurality of support wires.

25. The apparatus as claimed in claim 24 wherein guide rails are attached to said holding fixture frame and said support member is attached to said guide rails.

26. The apparatus as claimed in claim 23 wherein a portion of said support member is in contact with rollers mounted to said holding fixture frame.

27. The apparatus as claimed in claim 23 further comprising a plurality of vacuum devices positioned about the perimeter of the workpiece for holding the workpiece in place on said holding fixture frame.

28. A workpiece support apparatus for positioning a workpiece comprising:

a holding fixture frame;

a means to secure the workpiece to said holding fixture frame; and a support member including a plurality of support wires for supporting the workpiece, each of said support wires being coupled to a tensioner, and said support member being secured to said holding fixture frame for movement with respect to said holding fixture frame;

whereby at least a portion of said support member is adapted to contact the workpiece and whereby said holding fixture frame and the workpiece are movable in unison with respect to said support member while said support member contacts the workpiece.

29. A workpiece support apparatus for positioning a workpiece comprising:

a holding fixture frame;

a plurality of locator pins for securing said workpiece to said holding fixture frame; and a support member for supporting the workpiece, said support member being secured to said holding fixture frame for movement with respect to said holding fixture frame;

whereby at least a portion of said support member is adapted to contact the workpiece and whereby said holding fixture frame and the workpiece are movable in unison with respect to said support member while said support member contacts the workpiece.

30. A workpiece support apparatus for positioning a workpiece comprising:

a holding fixture frame mounted to an X-Y positioning system;

a means to secure the workpiece to said holding fixture frame; and a support member for supporting the workpiece, said support member being secured to said holding fixture frame for movement with respect to said holding fixture frame;

whereby at least a portion of said support member is adapted to contact the workpiece and whereby said holding fixture frame and the workpiece are movable in unison with respect to said support member by the X-Y positioning system while said support member contacts the workpiece.

31. The apparatus as claimed in claim 30 whereby said X-Y positioning system is mounted to a base.

\* \* \* \* \*